United States Patent [19]

Cutchey et al.

[11] Patent Number: 5,147,619
[45] Date of Patent: Sep. 15, 1992

[54] NICKEL RECOVERY USING A FLUIDIZED BED PROCESS

[75] Inventors: Christopher J. Cutchey, Jutbury; Trevor J. Keirle, Walsall, both of United Kingdom

[73] Assignee: Camlaw Limited, Tamworth, United Kingdom

[21] Appl. No.: 512,540

[22] Filed: Apr. 18, 1990

Related U.S. Application Data

[63] Continuation of Ser. No. 138,456, Dec. 18, 1987, abandoned.

[30] Foreign Application Priority Data

Feb. 19, 1986 [GB] United Kingdom ............ 86004080
Feb. 19, 1987 [WO] PCT Int'l Appl.... PCT/GB87/00122

[51] Int. Cl.$^5$ .................. C22B 23/00; B01J 38/30
[52] U.S. Cl. .................... 423/148; 423/74; 75/628; 502/41
[58] Field of Search .......... 423/44, 59, 74, 75, 423/107, 133, 148, 149; 75/82, 83, 623, 628, 631; 502/30, 41; 209/426

[56] References Cited

U.S. PATENT DOCUMENTS

| | | | |
|---|---|---|---|
| 1,306,871 | 6/1919 | Vis | 502/30 |
| 3,168,481 | 2/1965 | Erickson | 502/30 |
| 3,899,323 | 8/1975 | Van Slyke | 75/83 |
| 4,197,161 | 4/1980 | Friedrich et al. | 502/41 |
| 4,547,345 | 11/1985 | Sebenik et al. | 423/53 |

FOREIGN PATENT DOCUMENTS

| | | |
|---|---|---|
| 2499100 | 8/1982 | France ............ 423/148 |
| 85/00834 | 2/1985 | PCT Int'l Appl. |
| 730223 | 5/1955 | United Kingdom |
| 787297 | 12/1957 | United Kingdom |
| 824044 | 11/1959 | United Kingdom |
| 1367573 | 9/1974 | United Kingdom |
| 1384711 | 2/1975 | United Kingdom |
| 1499682 | 2/1978 | United Kingdom |

OTHER PUBLICATIONS

Leva, Max *Fluidization* McGraw-Hill, 1959, pp. 3, 5, 8-13 and 114-120.
von Bogdandy, Ludwig and Engell, Hans-Jürgen, *Die Reduktion der Eisenerze*, 1967, pp. 200, 201, 227, 228 and 238.
Othmer, Donald F, *Fluidization*, Reinhold Publishing Co., New York, 1956, pp. 20-22.
Hackh's Chemical Dictionary, 1974, 4th Edition, p. 261.

Primary Examiner—Gregory A. Heller
Assistant Examiner—Steven Bos
Attorney, Agent, or Firm—Spencer, Frank & Schneider

[57] ABSTRACT

A process for the recovery of nickel catalyst metal from a top portion of a fluidized bed consists essentially of the steps of providing a sludge material including spent catalyst including recoverable catalyst metal in the form of particles which are finely divided, and an organic material consisting essentially of fat, the organic material being combustible or otherwise degradable under conditions attainable by fluidized bed techniques; feeding the sludge material into a base portion of a fluidized bed including a bed of inert carrier material; converting the organic material to waste gases in the fluidized bed; maintaining the fluidized bed under conditions which cause the particles of recoverable catalyst metal to rise to a top portion of the fluidized bed, the recoverable catalyst metal comprising particles having an average particle size of less than 50 microns; removing the particles of recoverable catalyst metal and the waste gases from the top portion of the fluidized bed; and separating the particles of recoverable catalyst metal from the waste gases.

12 Claims, 1 Drawing Sheet

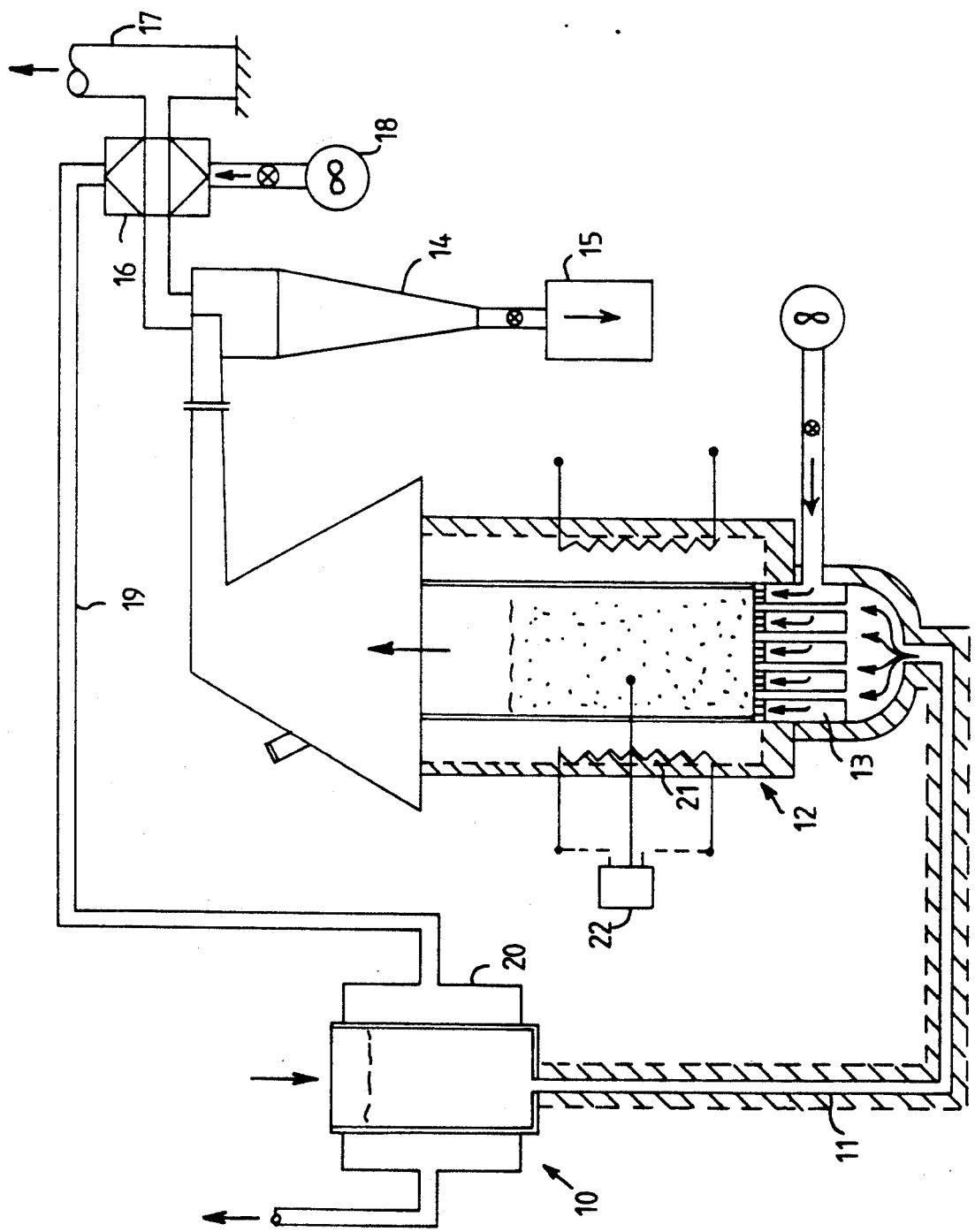

NICKEL RECOVERY USING A FLUIDIZED BED PROCESS

This application is a continuation, of application Ser. No. 07/138,456, filed Dec. 18th, 1987, now abandoned.

BACKGROUND OF THE INVENTION

1. Field of the Invention

The present invention concerns a novel application of fluidised bed technology for the recovery or extraction of materials such as metals from wastes or other sources. More particularly, metals in particulate form may be recovered, primarily but not exclusively as oxides, from material which includes substantial quantities of matter which is combustible or otherwise degradable, such as spent catalyst materials.

2. Background of the Art

The invention has been developed mainly in connection with the recovery of nickel (as an oxide) from spent hydrogenation catalysts, but also has other applications as will be evident from the following description.

Hydrogenation catalysts as supplied commercially for the hardening of fats and oils comprise finely divided nickel on a siliceous carrier formed into pellets with a hard fat for use with a liquid or molten state system. In use, the fat dissolves or melts and the nickel-on-carrier particles are dispersed throughout the system. The used catalyst particles are then separated by filtration into a slurry or sludge containing organic matter. This material may be returned to the reaction vessel and re-used several times, but after a period of use, it becomes spent and is removed from the system entirely.

A similar process is adopted for other hydrogenation processes, such as of nitriles to form amines where a 'Raney' nickel catalyst, a finely divided sponge nickel stored under inert gas or water, is introduced and dispersed through a system and removed contaminated with organic matter after its reaction is complete.

SUMMARY OF THE INVENTION

The present invention, in one specific aspect, is concerned with the recovery of the nickel content of this material as distinguished from catalyst regeneration methods in which a used catalyst is treated to remove impurities so that it can be re-used as a catalyst without further treatment. Such regeneratable catalysts essentially consist of finely divided metals on a suitable solid support medium and are used in gaseous phase reactions, such as catalytic cracking, in which the solid support medium remains physically intact. After a regeneration process, the catalytic metal is still bound to its solid support medium, whereas in the process in accordance with the invention the catalytic metal is separated from the support medium and usually oxidised, so that the catalyst is destroyed but the metal can be recovered.

According to one aspect of the invention a metal is recovered from a material in which the metal is associated with combustible or otherwise degradable matter by a process in which said material is fed into the lower portion of a fluidised bed which is maintained under conditions such that said degradable matter is consumed and eliminated in a volatile form and the metal which remains, either as a free metal or as a compound, rises to the top of the fluidised bed from where it is withdrawn.

The material being treated may be supplied in a pulverised form, or as a powder or granules or the like, or as a suspension or slurry in a liquid, or as a paste, or in a molten or semi-molten state.

In a typical application, the material may comprise a spent catalyst, such as finely divided nickel entrained in organic matter such as fat. Such material may be heated, preferably at least partly by heat recovered from the exhaust gases from the fluidised bed, to liquify the material at least to an extent sufficient to enable it to flow or at least be extruded. The softened or liquified material may be introduced into the fluidised bed through inlet nozzles distributed across and/or around the base of the fluidised bed. The bed may be fluidised by air and the operating conditions established such that the organic matter is burned off. For this purpose the bed may be heated either externally (for example by electric heaters or otherwise) or internally (for example by introducing fuel).

The process is applicable where the metal to be recovered is present initially in the material to be treated in a finely divided form such that the freed metal, or metal-containing, particles are rendered upwardly mobile under the operating conditions which exist in the fluidised bed or where the state of the metal content and the treatment conditions are such as to give rise to free particles containing the metal which are upwardly mobile. Typical particle sizes for this purpose may be below 50 microns although in some circumstances larger particle sizes may be encountered.

Depending on the nature of the metal concerned, it may be obtained either as the metal itself or at least partially as an oxide from which the metal can be recovered if required by appropriate chemical treatment. Under some circumstances, compounds other than oxides may also be formed.

It is envisaged that in many cases, where the organic content of the material is sufficiently high, the combustion of such organic matter may provide sufficient heat output to maintain the fluidised bed at the desired working temperature and that additional heating, for example from external electric heaters, will be required only during start-up.

Where the organic content is not sufficient to maintain the required temperature in this way, additional combustible matter may be supplied. For example, diesel oil or other suitable combustible fuel, including possibly waste matter for destruction, may be added to the material to be treated in the required proportions prior to its introduction to the fluidised bed. Alternatively, such a fuel may be supplied to the fluidised bed through a separate distribution system whereby the rate of supply can be controlled separately. Also, of course, external or other heaters could be used to supply additional heat when necessary.

Where combustion of the organic material involves a highly exothermic reaction, water may be added to the material to be treated, or supplied separately to the fluidised bed, to cool the bed and prevent its temperature rising excessively.

The fluidised bed may be constituted by the material being treated without the addition of a carrier medium, but if necessary a carrier medium may be employed.

Whilst the process has been described above in relation to the separation of metal particles from other matter, the process might also be used for the separation of non-metallic particles of sufficient intrinsic value from combustible matter, and accordingly the invention more generally resides in a process for separating particulate material of a non-combustible or non-degradable nature from a mixture of such material with combustible or degradable matter by introducing such mixture into the lower portion of a fluidised bed which is maintained under conditions such that said combustible or degradable matter is consumed and eliminated to leave the required particulate material which rises to the top of the fluidised bed where it is withdrawn. It will be understood that the terms "non-combustible" and "non-degradable" are to be interpreted relative to the operating conditions within the fluidised bed.

Accordingly, particulate materials which are non-combustible and non-degradable (under the conditions which exist in the fluidised bed) are recovered by processing in the fluidised bed under conditions such that combustible or degradable matter is eliminated and the required particulate matter, by a process of elutriation, rises through the fluidised bed so that it can be taken off at the top. In this way, particles of finely divided metals such as gold or platinum may be recovered as the metal, whereas particles of less inert metals, such as nickel, cobolt, or molybdenum may be recovered in the form of oxides which can be further processed to recover the metal if desired, or used in the production of other materials.

Whilst such process is particularly applicable where the material to be recovered is already in the required finely divided form, it will be appreciated that other residues or waste material could be comminuted as appropriate so as to reduce the particle size to an appropriate value. Thus, for example, printed circuit boards containing significant quantities of metals such as gold or platinum could be ground up finely and fed to the fluidised bed either in a pulverised form, or in the form of a paste in which the solid particles are mixed with a suitable fuel, such as diesel oil, to assist in the combustion of the non-metallic components.

Where the fluidised bed includes an inert carrier material, it may be necessary for such carrier material together with the recovered particles to be removed from the top of the bed and subjected to any suitable separation process, after which the carrier material may be returned to the fluidised bed.

BRIEF DESCRIPTION OF THE DRAWING

The sole drawing figure illustrates diagrammatically one arrangement for carrying out the process in accordance with the invention.

DESCRIPTION OF THE PREFERRED EMBODIMENTS

The invention will now be described by way of example, with reference to the accompanying drawing which illustrates diagrammatically one arrangement for carrying out the process in accordance with the invention.

Waste material, such as a paste of organic fatty matter containing particles of a spent catalyst, such as finely divided nickel on particles of an inorganic carrier substance, is fed into a pre-heater 10 where the temperature of the material is raised to a value such that it becomes liquid or semi-liquid and flowable. The softened material is then supplied through a thermally insulated pipe II to the interior of a fluidised bed furnace 12. The material is injected at or through the base of the fluidised bed, which is maintained in a fluidised state by air from a plenum chamber 13.

The bed is maintained at such a temperature that the organic material is degraded to volatile compounds, primarily by oxidation, leaving the nickel particles which are converted largely to oxide. The upward air flow through the bed causes the oxide particles to rise through the bed by a process of elutriation due to the initially finely divided form of the nickel in the catalyst material. The oxide particles are carried upwardly out of the bed and into a cyclone separator 14 and the recovered oxide is collected in a container 15. Waste gasses from the bed are fed from the separator 14 to a heat exchanger 16 and thence to an exhaust 17. A fan 18 supplies cold air to the other side of the heat exchanger to extract heat from the hot exhaust gasses, and pipe 19 conveys the heated air to a jacket 20 forming part of the pre-heater 10.

Depending on the calorific content of the organic material fed to the fluidised bed, the temperature of the bed may largely be maintained by the combustion of such material. However, an external electric heater 21 may be provided to bring the bed initially up to the required operating temperature.

A controller 22 may also be provided to adjust the output of the heater 21 to maintain the bed temperature if necessary whilst the process is in operation. Alternatively, a combustible substance such as diesel oil may be added to the material in the pre-heater 10 or it may be injected into the bed separately for the purpose of raising the bed to the working temperature and maintaining at that temperature.

Where the combustion reaction is highly exothermic, water may be added or injected instead of fuel.

The invention is especially suitable for the recovery of catalyst metals since such metals are used in very finely divided form and the oxide particles produced can be separated from the fluidised bed by elutriation. Noble metals may also be recovered as the metals rather than their oxides. The invention may also be utilised for the recovery of similar metals, as oxides or other compounds or as such, from other sources of waste material providing the recoverable metal content thereof is in, or can be reduced to, sufficiently finely divided form.

What is claimed is:

1. A process for the recovery of nickel catalyst metal from a top portion of a fluidized bed, the process consisting essentially of the steps of:

providing a sludge material including spent catalyst comprising recoverable catalyst metal in the form of particles of nickel which are finely divided, and an organic material consisting essentially of fat, the organic material being combustible or otherwise degradable under conditions attainable by fluidized bed techniques;

feeding the sludge material into a base portion of a fluidized bed comprising a bed of inert carrier material;

converting the organic material to waste gases in the fluidized bed;

maintaining the fluidized bed under conditions which cause the particles of recoverable catalyst metal to rise to a top portion of the fluidized bed, the recoverable catalyst metal comprising particles having an average particle size of less than 50 microns;

removing the particles of recoverable catalyst metal and the waste gases from the top portion of the fluidized bed; and separating the particles of recoverable catalyst metal from the waste gases.

2. The process according to claim 1, wherein the spent catalyst further comprises a carrier, and wherein the process further comprises separating the particles of recoverable catalyst metal from the carrier in the fluidized bed.

3. The process according to claim 1, wherein the particles of recoverable catalyst metal separated from the waste gases comprise nickel oxide.

4. The process of claim 1, wherein the organic material is combustible and the conversion step comprises heating the fluidized bed to a temperature which causes the combustion of the organic material.

5. The process of claim 4, further comprising adding additional combustible material to the sludge material and heating the fluidized bed to a temperature which causes the combustion of the organic material and the added combustible material.

6. The process of claim 1, further comprising adding water to the sludge material and cooling the fluidized bed by evaporation of the water to stabilize the temperature of the fluidized bed.

7. The process of claim 1, further comprising injecting water into the fluidized bed to stabilize the temperature of the fluidized bed.

8. The process of claim 1, further comprising heating the sludge material prior to feeding the sludge material into the fluidized bed.

9. The process of claim 1, wherein the particles of recoverable catalyst metal comprise free nickel metal.

10. The process of claim 1, wherein the particles of recoverable catalyst metal comprise a nickel compound.

11. A process for the recovery of nickel catalyst metal in the form of nickel oxide from a top portion of a fluidized bed, the process consisting essentially of the steps of:

providing a sludge material including spent catalyst comprising recoverable catalyst metal in the form of nickel particles which are finely divided, and organic material consisting essentially of fat, the organic material being combustible or otherwise degradable under conditions attainable by fluidized bed techniques;

feeding the sludge material into a base portion of a fluidized bed comprising a bed of inert carrier material;

converting the organic material to waste gases in the fluidized bed;

oxidizing the particles of recoverable catalyst metal to particles of a recoverable metal oxide;

maintaining the fluidized bed under conditions which cause the particles of recoverable metal oxide to rise to a top portion of the fluidized bed, the recoverable metal oxide comprising particles having an average particle size of less than 50 microns;

removing the particles of recoverable metal oxide and the waste gases from the top portion of the fluidized bed; and separating the particles of recoverable metal oxide from the waste gases.

12. A process for the recovery of nickel catalyst metal, the process consisting essentially of the steps of:

providing a material which has a form selected from the group consisting of a suspension, a slurry, a paste, a molten state and a semi-molten state, such material including spent catalyst comprising recoverable catalyst metal in the form of particles of nickel which are finely divided, and an organic material consisting essentially of fat, the organic material being combustible or otherwise degradable under conditions attainable by fluidized bed techniques;

feeding the material into a base portion of a fluidized bed comprising a bed of inert carrier material;

converting the organic material to waste gases in the fluidized bed;

maintaining the fluidized bed under conditions which cause the particles of recoverable catalyst metal to rise to a top portion of the fluidized bed, the recoverable catalyst metal comprising particles having an average particle size of less than 50 microns;

removing the particles of recoverable catalyst metal and the waste gases from the top portion of the fluidized bed; and separating the particles of recoverable catalyst metal from the waste gases.

* * * * *

UNITED STATES PATENT AND TRADEMARK OFFICE
CERTIFICATE OF CORRECTION

PATENT NO. : 5,147,619
DATED : September 15, 1992
INVENTOR(S) : Christopher John Cutchey and Trevor James Keirle It is certified that error appears in the above-indentified patent and that said Letters Patent is hereby corrected as shown below:

On the title page: Item

[73]  Change the assignee's name from "Camlaw Limited, Tamworth, United Kingdom" to
--Camlaw Limited, Tamworth, United Kingdom, Christopher John Cutchey and Trevor James Keirle--.

Signed and Sealed this

Fifteenth Day of October, 1996

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,147,619
DATED : September 15, 1992
INVENTOR(S) : Christopher John Cutchey and Trevor James Keirle It is certified that error appears in the above-indentified patent and that said Letters Patent is hereby corrected as shown below:

Title page, item
[73]  Change the assignee's name from "Camlaw Limited, Tamworth, United Kingdom" to
--Camlaw Limited, Tamworth, United Kingdom, Christopher John Cutchey and Trevor James Keirle--.

Signed and Sealed this

Seventeenth Day of December, 1996

Attest:

BRUCE LEHMAN

*Attesting Officer*    *Commissioner of Patents and Trademarks*